US008004143B2

(12) United States Patent
Yanagizawa

(10) Patent No.: US 8,004,143 B2
(45) Date of Patent: Aug. 23, 2011

(54) CARBON BRUSH OF MOTOR AND METHOD FOR PRODUCING THE SAME

(75) Inventor: Iwao Yanagizawa, Suzuka (JP)

(73) Assignees: Mitsuba Corporation, Kiryu-shi (JP); Kunimitsu Carbon Industrial Co., Ltd., Suzuka-shi (JP)

( * ) Notice: Subject to any disclaimer, the term of this patent is extended or adjusted under 35 U.S.C. 154(b) by 45 days.

(21) Appl. No.: 12/083,965

(22) PCT Filed: Nov. 6, 2006

(86) PCT No.: PCT/JP2006/322082

§ 371 (c)(1),
(2), (4) Date: Apr. 23, 2008

(87) PCT Pub. No.: WO2007/055164

PCT Pub. Date: May 18, 2007

(65) Prior Publication Data

US 2009/0230814 A1 Sep. 17, 2009

(30) Foreign Application Priority Data

Nov. 10, 2005 (JP) ................................ 2005-326095

(51) Int. Cl.
*H02K 13/00* (2006.01)
*H01R 39/20* (2006.01)
*H01R 39/24* (2006.01)
*H01R 39/36* (2006.01)
*H01R 39/18* (2006.01)

(52) U.S. Cl. ........ 310/252; 310/248; 310/249; 310/251; 310/253; 264/104; 264/105

(58) Field of Classification Search .................. 310/248, 310/251, 253, 252; 264/104, 105; *H02K 13/00; H01R 39/18, 39/36, 39/24, 39/20*
See application file for complete search history.

(56) References Cited

U.S. PATENT DOCUMENTS

| | | | | |
|---|---|---|---|---|
| 5,441,683 | A * | 8/1995 | Kammerer et al. | 264/105 |
| 5,447,681 | A * | 9/1995 | Tai Seung et al. | 419/36 |
| 6,909,219 | B2 * | 6/2005 | Takahashi et al. | 310/251 |
| 6,949,863 | B2 * | 9/2005 | Otani et al. | 310/251 |
| 2005/0099088 | A1 * | 5/2005 | Suzuki et al. | 310/237 |

(Continued)

FOREIGN PATENT DOCUMENTS

JP A-03-103054 4/1991

(Continued)

OTHER PUBLICATIONS

Mathis Wissler, "Graphite and carbon powders for electrochemical applications", Apr. 18, 2006,Journal of Power Source 156 (2006), pp. 142-150.*

Webster's Revised Unabridged Dictionary (1913), Definition of Squamous, http://www.websters-online-dictionary.org/definitions/Squamous?cx=partner-pub-0939450753529744%3Av0qd01-tdlq&cof=FORID%3A9&ie=UTF-8&q=Squamous&sa=Search#922.*

(Continued)

*Primary Examiner* — Quyen Leung
*Assistant Examiner* — Terrance Kenerly
(74) *Attorney, Agent, or Firm* — Oliff & Berridge, PLC

(57) ABSTRACT

An electric motor that includes a rotor; a coil that is wound around the rotor; and a carbon brush that supplies power to the coil, wherein the brush is formed by using a raw material in which artificial graphite whose crystallites are flaky in shape is mixed with natural graphite whose crystallites are squamous or scaly in shape.

7 Claims, 4 Drawing Sheets

U.S. PATENT DOCUMENTS

2005/0200228 A1* 9/2005 Ogi ............................... 310/219
2009/0255660 A1* 10/2009 Cornie et al. ................. 165/185

FOREIGN PATENT DOCUMENTS

| | | |
|---|---|---|
| JP | A-2004-014294 | 1/2004 |
| JP | A-2004-173486 | 6/2004 |
| JP | A-2005-102491 | 4/2005 |
| JP | A 2009-139263 | 6/2009 |

OTHER PUBLICATIONS

*Kotai-junkatsu-handbook* (*Solid Substance Lubrication Handbook*), Edited by Masahisa Matsunaga and Yuko Tsuya, Published by Saiwaishobo in 1978.

*Carbon Family. Diversity and Assessment*, Written and edited by Michio Inagaki, Published by Aguneshofusha in 2001.

http:www.nittech.co.jp/M04/M0404.html.

* cited by examiner

CARBON BRUSH OF MOTOR AND METHOD FOR PRODUCING THE SAME

CROSS-REFERENCE TO RELATED APPLICATIONS

This application is the U.S. National Stage of PCT/JP2006/322082, filed Nov. 6, 2006, which claims priority from JP2005-326095, filed Nov. 10, 2005, the entire disclosure of which is incorporated herein by reference hereto.

BACKGROUND

The present disclosure relates to a carbon brush of an electric motor and a method for producing the carbon brush.

There exists an electric motor in which an armature shaft of an armature, around which a coil is wound, is pivotally rotatably supported by a yoke to which a permanent magnet is installed. A commutator is provided to the armature shaft. The coil, which is wound around the armature, is electrically connected to the commutator. The coil is supplied with power when the commutator is slidingly in contact with a brush to which an external power source is connected. The armature thus rotates as the coil is excited.

When the brush is made of carbon, such as a graphite brush, there exist problems. While such a brush slides along the commutator, electrical abrasion and mechanical abrasion on sliding-contact surfaces (sliding surfaces) occur toward the commutator. A spark discharge is also caused because of deterioration in a rectification property. As a result, the durability is deteriorated. Therefore, such abrasion and deterioration in the rectification property should be inhibited so that the durability can be enhanced.

Regarding the graphite brush, carbon coatings are formed on sliding-contact surfaces by air around the commutator or air in air holes of the brush. Such carbon coatings may contribute to the inhibition of abrasion and deterioration in the rectification property. However, the carbon coating formation is strongly affected by the conditions of the sliding-contact portions between the brush and the commutator based on the surrounding environment of the motor when it is used, such as temperature and humidity. When an atmospheric temperature around the sliding-contact portions is high, for example, carbon coatings are impaired. A condition of the sliding-contact between the brush and the commutator is then deteriorated. Sparks are also increasingly generated. As a result, the durability is deteriorated.

A proposed graphite brush of an electric motor is thus structured so as to be capable of controlling the conditions of formation of carbon coatings in accordance with the conditions in which the electric motor graphite brush is used. A rectification property and a durability of the electric motor may thus be improved (see Japanese Published Unexamined Patent Application No. 2004-173486, for example). As the proposed method, the brush is formed through successive steps. Natural graphite is used as a raw material; a binder, an additive, and copper are added thereto; and press molding and a sintering process are carried out, thereby forming the brush. After that, liquid that has a high boiling point than water is impregnated into air holes that are formed inside the formed brush. Accordingly, carbon coatings can be formed at a higher temperature, a temperature of a sliding-contact portion is greater than or equal to 100 degrees Celsius; and abrasion can be reduced between the brush and the commutator in high temperature regions. As a result, the durability may be enhanced.

SUMMARY

In the conventional art described above, however, there is a problem in that the number of steps is increased so as to be cumbersome and complicated. The impregnation step is also difficult to carry out and the productivity is low because the liquid impregnation step is carried out after the brush is formed through the steps of the press molding and the sintering by using natural graphite. The cost is also increased.

In addition, as an electric motor that is mounted on a modem vehicle, there is a case in which an actuator is composed of a plurality of electric motors. Such electric motors are thus required to be high voltage compatible as well as compact. In the compact and high voltage electric motors, when a high voltage is applied to sliding-contact surfaces between a compact brush and a commutator, its rectification property may be deteriorated. Sparking may also be increasingly generated. Clearly, the brush and the commutator will be further abraded away. Therefore, merely controlling conditions of carbon coating formation is insufficient in order to overcome the problems. The present disclosure solves this problem as well as other problems and is also able to achieve various advantages.

The disclosure addresses an exemplary aspect of a carbon brush that includes a raw material in which artificial graphite whose crystallites are flaky in shape is mixed with natural graphite whose crystallites are squamous or scaly in shape.

In another exemplary aspect, at least twenty to eighty percent by weight of the artificial graphite is mixed in the carbon brush.

In another exemplary aspect, approximately fifty percent by weight of the artificial graphite is mixed in the carbon brush.

In another exemplary aspect, there is provided a method for manufacturing a carbon brush of an electric motor that supplies power to a coil that is wound around a rotor of the electric motor, the method includes the successive steps of: mixing artificial graphite whose crystallites are flaky in shape with natural graphite whose crystallites are squamous or scaly in shape; press-molding the mixed graphite; and sintering the press-molded graphite so as to form the carbon brush According to various exemplary aspects of the disclosure, even when the brush is used with high voltage compatible electric motors, its rectifying states remain satisfactory under a wide range of temperature conditions.

According to various exemplary aspects of the disclosure, by the step of preparing the raw material by mixing artificial graphite with natural graphite, and then by the usual steps of forming a brush, the brush can be provided with satisfactory rectification.

BRIEF DESCRIPTION OF THE DRAWINGS

Various embodiments of the disclosure will be described with reference to the drawings, wherein.

DETAILED DESCRIPTION OF EMBODIMENTS

Figure 1:
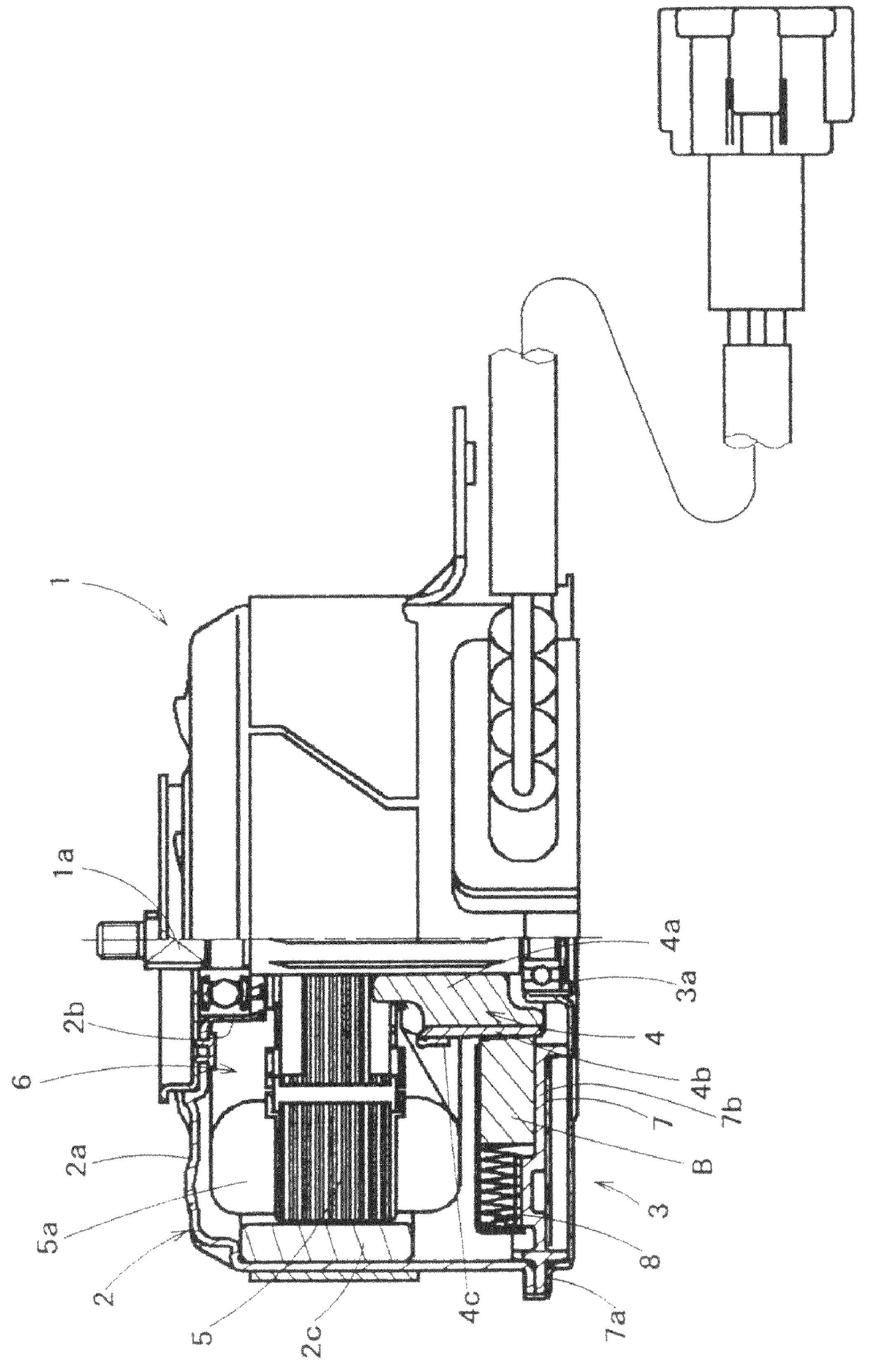
FIG. 1 is a side elevational view partially in cross section of an electric motor.

Next, various embodiments of the present disclosure will be described based on the drawings. In FIG. 1, reference numeral 1 denotes an electric motor (a rotating electric machine) that serves as a high voltage compatible fan motor. A motor shaft (an armature shaft) 1*a* of the electric motor 1 is configured to be pivotally supported at one end by a bottom portion 2*a* of a bottomed tubular yoke 2 via a bearing 2*b*. A load is applied on an end portion that projects toward an outside from the yoke bottom portion 2*a*. The other end of the motor shaft 1*a* is pivotally supported via a bearing 3*a* by an end bracket 3 that covers an open end of the yoke 2.

A commutator 4 is positioned at a side of the end bracket 3 and is integrally fitted to the motor shaft 1*a* (see FIG. 1). A plurality of pieces of iron cores 5 are fitted at outside portions at a side of the yoke bottom 2*a* from the commutator 4. A plurality of coils 5*a* is wound around outer peripheries of the iron cores 5. In the commutator 4, a plurality of conductive commutator segments 4*b* are circumferentially provided integrally to an outer peripheral surface of a tubular fitting portion 4*a* that is formed of a resin material. Riser segments 4*c* that are bent so as to turn to their external diameter sides are formed at one end side of respective conductive commutator segments 4*b*. Predetermined coils 5*a* are respectively electrically connected to these riser segments 4*c*. A rotor (an armature) 6 is thus formed.

In addition, of the iron cores 5, which structure the armature 6, both axial end portions are made to be large-diameter ring-shaped bodies. A space is then provided around an outer periphery of the motor shaft 1*a*. One end of the fitting portion 4*a* of the commutator 4 is installed therein. Compactification is thus achieved in a shaft length direction.

In FIG. 1, reference numeral 7 denotes a brush holder stay. In the brush holder stay 7, an outer peripheral portion 7*a* is supported so as to be held between the end bracket 3, which pivotally supports the other end of the motor shaft 1*a*, and the open end of the yoke 2. Brush holders 7*b* are circumferentially formed at one end side surface of the brush holder stay 7.

Brushes B to which the present disclosure is applied are respectively installed so as to be radially slidable in the brush holders 7*b*. An elastic mechanism 8 is installed into respective brush holders 7*b* so that the brushes B are pressed toward an inner diameter direction (an axial direction of the motor shaft 1*a*). The respective brushes B are thus set such that tip end surfaces of the brushes B pressingly slide and contact the commutator segments 4*b* of the commutator 4. When an external power source is supplied to the brushes B via unillustrated pigtails that are led from the brushes B, the power is distributed to the coils 5 via the commutator 4. When the coils 5*a* are excited in accordance with the power distribution, the armature 6 rotates around a magnetic field that is generated by a permanent magnet 2*c* that is firmly fixed to an inner peripheral surface of the yoke 2.

The electric motor 1 uses compound brushes B, as will be described later, that are formed by using a raw material in which natural graphite and artificial graphite are mixed. While the electric motor 1 is driven, at an atmospheric temperature of sliding portions between the compound brushes B and the commutator 4 (commutator segments 4*b*), abrasion rates of the sliding portions can be reduced in both a room temperature atmosphere and a high temperature atmosphere. Its stable rectifying states are thus retained. The durability is also enhanced.

Now, widely used brushes are, for example, natural brushes NB in which natural graphite is used as a raw material and artificial brushes AB in which artificial graphite is used as a raw material. The present disclosure focuses on the shapes, sizes, and electric resistance of crystallites of natural and artificial graphite characteristics. Here, in order to examine rectifying states, the brushes NB and AB are respectively applied with the high voltage compatible with the electric motor 1.

Figure 2A:
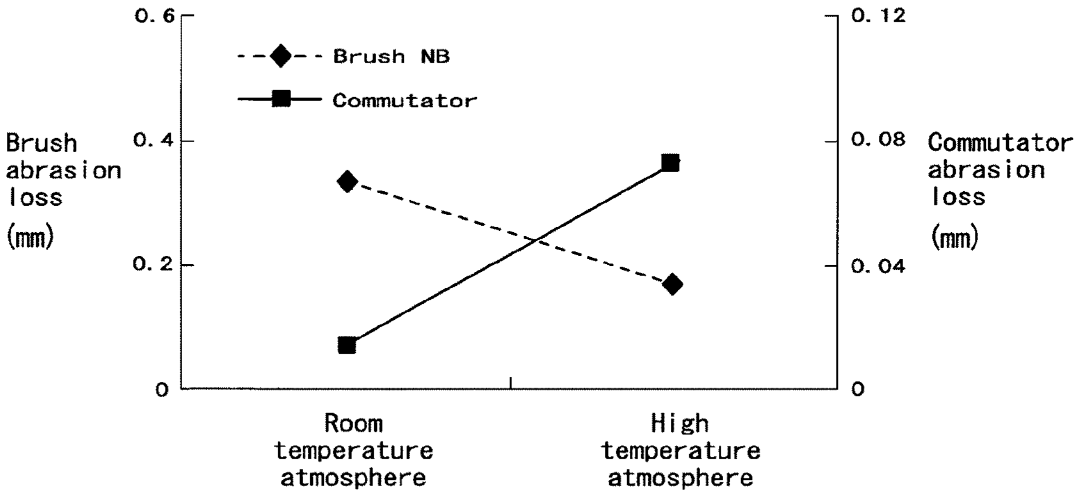
FIG. 2A is a chart that shows variations in abrasion rates of a brush and a commutator with respect to changes in temperature of the natural brush.
Figure 2B:
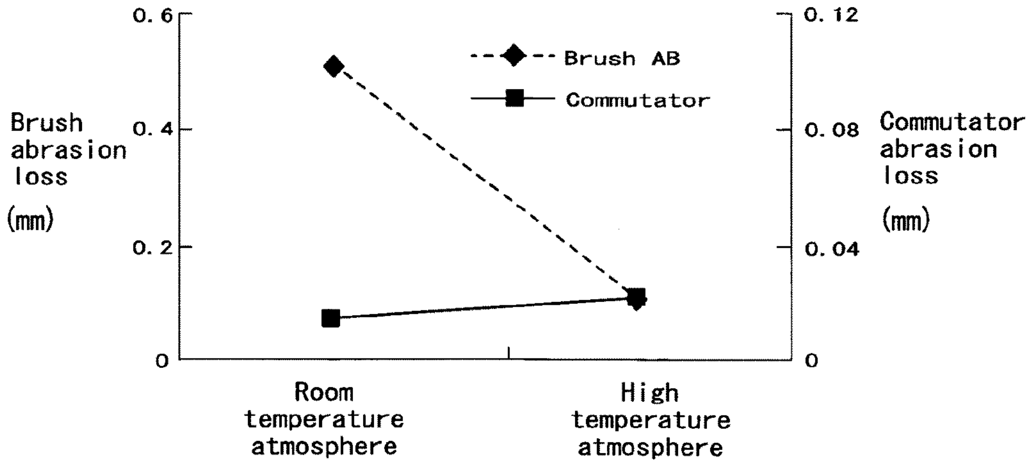
FIG. 2B is a chart that shows variations in abrasion rates of a brush and a commutator with respect to changes in temperature of the artificial brush.

As shown in FIGS. 2A and 2B, abrasion rates, μm/h (micrometer per hour), of the brush NB, the brush AB, and the commutator 4 are measured at a sliding-contact portion between the brush NB and the commutator 4, and the brush AB and the commutator 4. The measurement of the abrasion rates are based on cases in which the electric motor 1 is driven under respective conditions in a room temperature atmosphere—an atmospheric temperature at the sliding-contact portion is approximately 20 degrees Celsius—and a high temperature atmosphere—an atmospheric temperature at the sliding-contact portion is approximately 80 degrees Celsius.

According to measured results, when the natural brush NB is used (see FIG. 2A), both the brush NB and the commutator 4 are worn away in the room temperature atmosphere, and the abrasion rate of the commutator 4 is accelerated in the high temperature atmosphere. When the artificial brush AB is used, both the brush AB and the commutator 4 are worn away in the room temperature atmosphere. In particular, the abrasion of the brush AB is remarkably accelerated, and the abrasion rate of the brush AB is reduced in the high temperature atmosphere.

Regarding the natural brush NB, although a carbon coating is difficult to form on a sliding surface in the room temperature atmosphere, a smooth sliding performance can be provided because shapes of crystallites are squamous or scaly. The abrasion rate of the commutator 4 can thus be reduced. However, because of a lower specific resistance of the natural brush NB, its rectification property can be deteriorated. The abrasion of the brush NB can thus be accelerated. On the other hand, in the high temperature atmosphere, because of larger crystallites of the natural graphite, a carbon coating may be insufficient. The abrasion of the commutator 4 may thus be accelerated.

Regarding the artificial brush AB, because of smaller crystallites of artificial graphite, in the room temperature atmosphere, a carbon coating is more difficult to form than the natural brush NB. The abrasion of the brush AB may thus be accelerated. On the other hand, in the high temperature atmosphere, because a carbon coating is easier to form, both the brush AB and the commutator 4 may achieve states of the reduced abrasion rates.

Regarding carbon coating formation, a carbon coating can be formed (adhered) onto a commutator when an absorbed film of moisture vapor or the like on a surface of a fine single crystal of carbon reaches a critical temperature. Natural graphite that has larger crystallites has smaller specific surface areas of the crystallites. The carbon coating may thus be difficult to form in the high temperature atmosphere. On the other hand, because artificial graphite has smaller crystallites, specific surface areas of the crystallites are larger. The carbon coating may thus be easier to form.

Based on the above observations, a compound brush B can be formed by mixing natural graphite and artificial graphite so as to be excellent in a rectifying state even when being applied to a high voltage compatible electric motor, with which a conventional brush may be deteriorated in its rectifying state. Here, four types of compound brushes B1, B2, B3, and B4 are prepared by various mixing ratios thereof and are respectively built into the high voltage compatible electric motor 1.

Figure 3A:
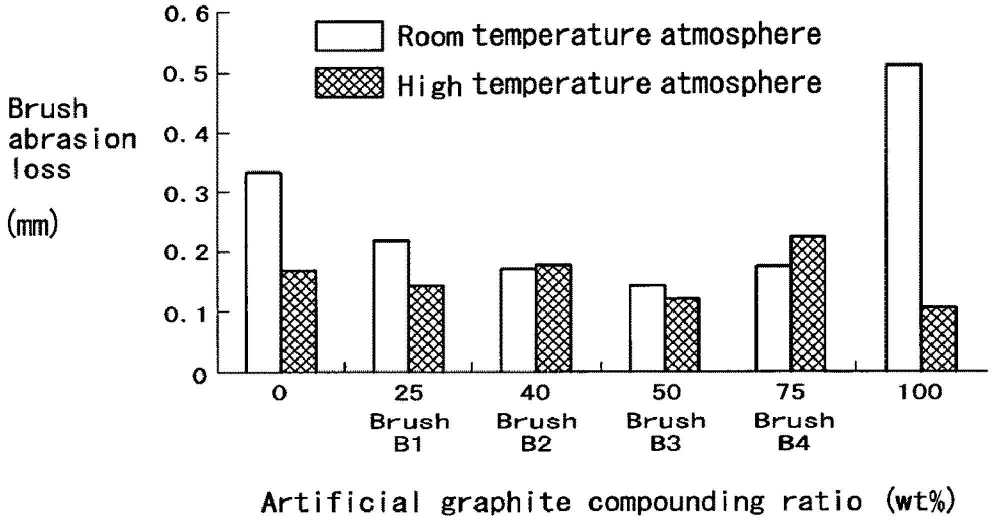
FIG. 3A is a comparison chart in which abrasion rates of compound brushes based on various compounding ratios are measured with respect to changes in temperature.
Figure 3B:
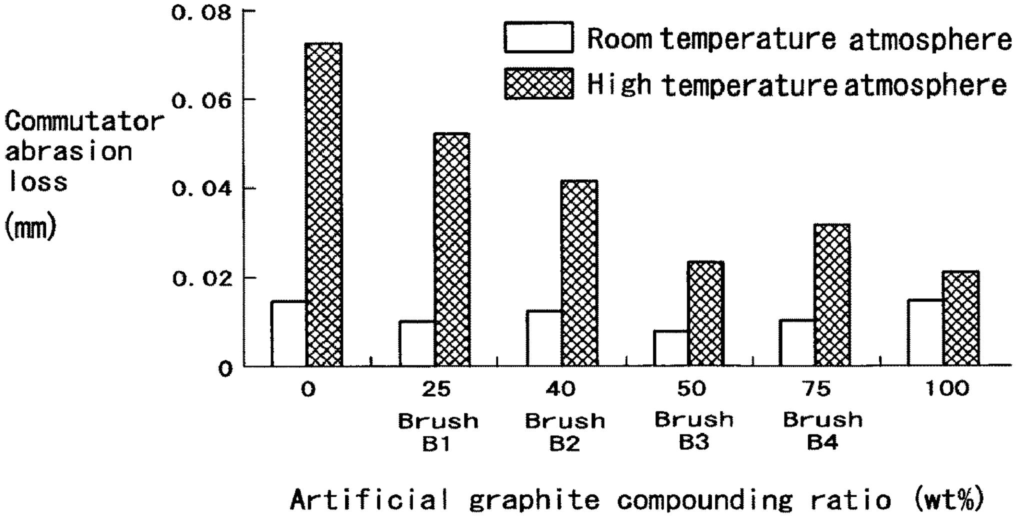
FIG. 3B is a comparison chart in which abrasion rates of a commutator based on the compounding ratios of the compound brushes are measured with respect to changes in temperature.

As in FIGS. 3A and 3B, abrasion rates are measured at sliding-contact portions between the respective compound brushes B1, B2, B3, and B4, and the commutator 4. The measurement of the abrasion rates are based on cases in which the electric motor 1 is driven under the respective conditions in the room temperature atmosphere (the atmospheric temperature at a sliding-contact portion is approximately 20 degrees Celsius) and the high temperature atmosphere (the atmospheric temperature at a sliding-contact portion is approximately 80 degrees Celsius).

In each chart of FIGS. 3A and 3B, compounding ratios (weight percentages, wt %) of artificial graphite with respect to natural graphite are plotted on an abscissa. The compound brush B1 is formed such that 75 percent of natural graphite and 25 percent of artificial graphite are mixed by weight. The compound brush B2 is formed such that 60 percent of natural graphite and 40 percent of artificial graphite are mixed by weight. The compound brush B3 is formed such that each 50 percent of natural graphite and artificial graphite is mixed by weight. The compound brush B4 is formed such that 25 percent of natural graphite and 75 percent of artificial graphite are mixed by weight. Note that on the abscissa, an artificial graphite compounding ratio of 0% by weight is the natural brush NB, and an artificial graphite compounding ratio of 100% by weight is the artificial brush AB, both of whose measured values respectively shown in FIGS. 3A and 3B are the same as respectively shown in FIGS. 2A and 2B.

As shown in the chart of FIG. 3A, when the compound brushes B1, B2, B3, and B4 are used, brush abrasion rates are reduced in both the room temperature atmosphere and the high temperature atmosphere. In particular, the reduction ratio is superior at the brush B3 in which a compounding ratio of artificial graphite with respect to natural graphite is 50 percent.

As shown in the chart of FIG. 3B, when the compound brushes B1, B2, B3, and B4 are used, commutator 4 abrasion rates are reduced in both the room temperature atmosphere and the high temperature atmosphere. In particular, the reduction ratio is clear in the high temperature atmosphere.

According to those observed results, the satisfactory sliding characteristic of the natural graphite can be seen in the room temperature atmosphere. Because specific resistances of the compound brushes B1, B2, B3, and B4 are increased so as to be higher than the specific resistance of the natural brush NB, the abrasion of the mixed brushes B1, B2, B3, and B4 can thus be inhibited.

On the hand, in the high temperature atmosphere, because of the smaller crystallites of the artificial graphite, carbon coating is easier to form at the higher temperature. The abrasion of the compound brushes B1, B2, B3, and B4, and the commutator 4 can thus be inhibited.

It follows that by using the compound brushes B1, B2, B3, and B4, in which artificial graphite is mixed with natural graphite, i.e., approximately 20 to 80% by weight of artificial graphite is mixed with natural graphite, and preferably the compound brush B3, in which 50% of artificial graphite is mixed by weight, the high-voltage compatible electric motor 1 can retain its satisfactory rectifying state, in which the abrasion rates of the compound brushes B1, B2, B3, and B4, and the commutator 4 are reduced within a wide temperature range from the room temperature atmosphere up to the high temperature atmosphere. The durability can thus be enhanced.

Figure 4:
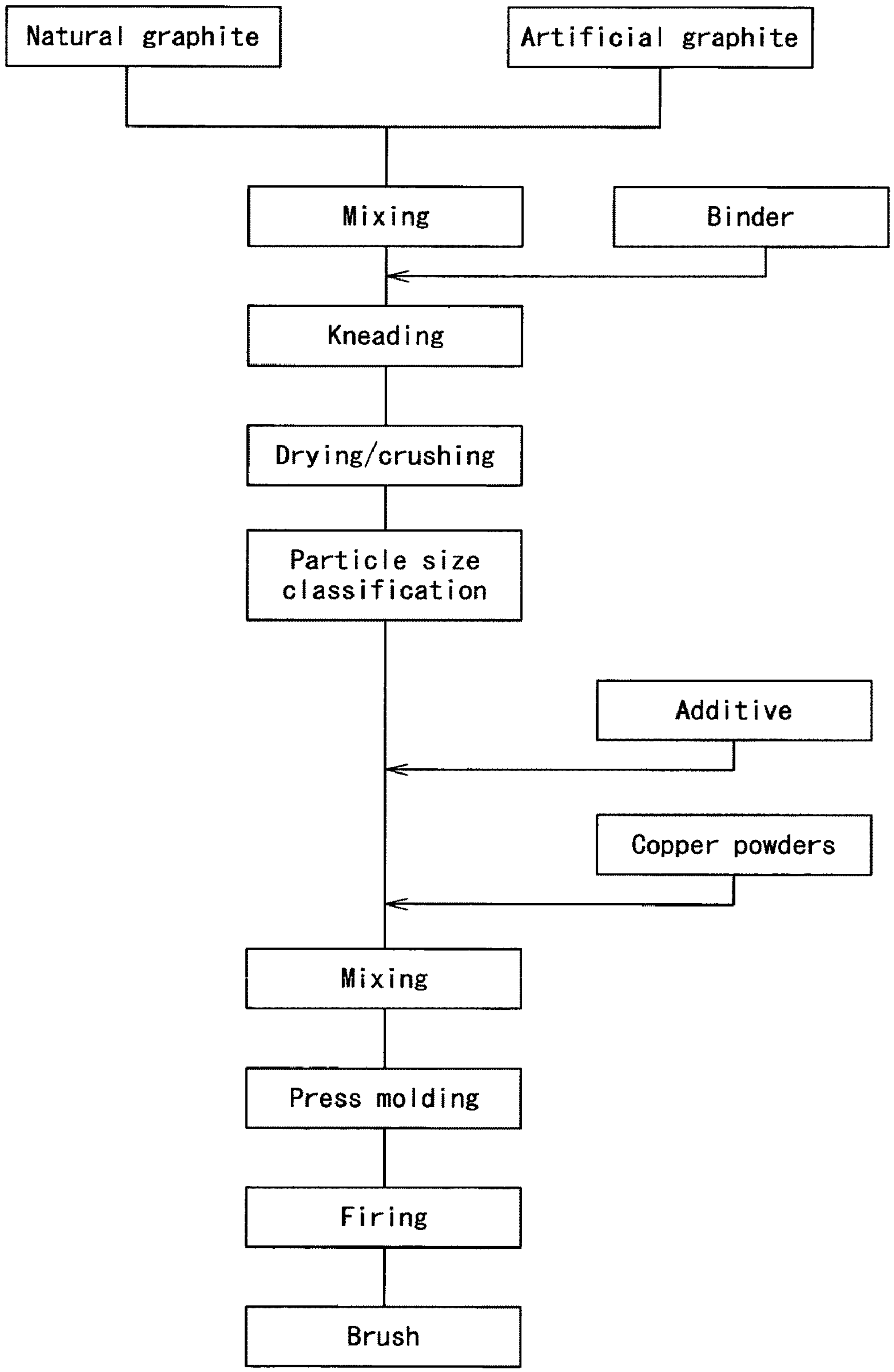
FIG. 4 is a flowchart that illustrates a procedure for forming a compound brush.

Next, an exemplary procedure for forming the compound brush using a raw material in which natural graphite and artificial graphite are mixed will be described based on a flowchart of FIG. 4. As the raw material of the compound brush, natural graphite whose crystallites are squamous or scaly in shape, and whose average particle diameter is 20 to 200 μm (preferably 100 μm), and artificial graphite whose crystallites are flaky in shape, and whose average particle diameter is 10 to 100 μm, (preferably 50 μm), are mixed together by an appropriate ratio. 50% by weight of the natural graphite and the artificial graphite each are mixed together in the present embodiment. With respect to a total weight of the natural graphite and the artificial graphite, a binder is added thereto in 10 to 50% by weight, or preferably 30% by weight, such as thermosetting phenol resin or thermosetting epoxy resin. This material is then kneaded for an hour under a temperature condition of 20 to 80 degrees Celsius, or preferably, 50 degrees Celsius.

Subsequently, by drying and crushing the kneaded material into pieces, and screening by particle size (see FIG. 4), the graphite particles are made to have particle diameters of 10 to 400 μm, or preferably, 200 μm. An additive is added thereto for film adjustment. Here, the additive consists of chemical compounds, such as molybdenum (Mo), tungsten (W), silicon (Si), aluminum (Al), and the like. With an average particle diameter of 2 to 50 μm, or preferably approximately 10 μm, 0.1 to 5% by weight of, or preferably 2% by weight, of the additive is added thereto with respect to a total weight of the screened graphite.

In addition, in order to adjust the resistance of the brush, electrolytic copper powders are added (see FIG. 4) with a 10 to 50 μm or preferably 30 μm average particle diameter. The added electrolytic copper powders is set to be 1 to 50% by weight with respect to the total weight of the screened graphite Those graphite particles, the additive, and the electrolytic copper powders are thus well mixed together.

The mixed material is then moved into a predetermined molding die and is press molded (see FIG. 4) by applying molding pressure of 100 to 300 newtons per square millimeter, or preferably 200 newtons per square millimeter thereto. The press-molded material is fired for two hours under a temperature condition of 200 to 800 degrees Celsius, or preferably 500 degrees Celsius, which thereby provides a sintered body. The sintered body is processed into a proper shape, which finally forms a mixed brush (B3).

The procedure for forming the mixed brush is entirely carried out on the basis of a procedure for forming a general-purpose graphite brush except for the step of mixing natural graphite and artificial graphite as the raw material. In other words, without adding any especially difficult step, the mixed brush can be formed so as to be capable of maintaining its stable rectifying state within the wide temperature range even while being used for the high voltage compatible electric motor.

In the present embodiment structured as described above, the external power source is supplied to the coils 5*a* of the rotor 6 of the electric motor 1 via the commutator 4 from the brushes B. As the brushes B, which slidingly contacts the commutator 4, the compound brushes B are provided by using graphite into which natural graphite and artificial graphite are mixed as the raw material. The abrasion rates of the brushes B or the commutator 4 can be reduced at both the room temperature atmosphere and the high temperature atmosphere. Even when the brushes B are employed for the high-voltage compatible electric motor 1, its rectifying state can be satisfactory. The durability can thus be enhanced.

Furthermore, in order to form the mixed brush B, the conventional general-purpose brush forming steps can be compatible with the step of mixing artificial graphite with natural graphite as the raw material. The high voltage compatible electric motor 1 compatible brush B can thus be provided with no cost increases and no complicated additional steps.

In addition, it is a matter of course that the present disclosure is not limited to the embodiment mentioned above. When the compound brushes are applied to general-purpose electric motors, too, their satisfactory rectifying states can be maintained within the wide range of temperatures from the room temperature atmosphere up to the high temperature atmosphere.

The present disclosure is useful for carbon brushes of electric motors in order to supply power to coils that are wound around armatures of electric motors, and methods for manufacturing such carbon brushes. Through the steps of forming usual brushes, the carbon brushes of the present disclosure can be formed by using the raw material where artificial graphite is mixed with natural graphite. Moreover, when the carbon brushes of the present disclosure are employed even for the high-voltage compatible electric motors, in which abrasion and deterioration of their rectification property are pronounced while natural graphite based carbon brushes are used, abrasion thereof is instead inhibited under the wide range of temperature conditions. The rectifying state can thus be satisfactory. The durability can also be enhanced.

What is claimed is:

1. A carbon brush, comprising:

a raw material in which artificial graphite whose crystallites are flaky in shape, the artificial graphite having an average particle diameter from 10 to 100 μm, is mixed with natural graphite whose crystallites are squamous or scaly in shape, the natural graphite having an average particle diameter from 20 to 200 μm, wherein at least 20 to 80% by weight of the artificial graphite is mixed.

2. The carbon brush according to claim 1, wherein approximately 50% by weight of the artificial graphite is mixed.

3. A method for manufacturing a carbon brush of an electric motor that supplies power to a coil that is wound around a rotor of the electric motor, comprising the successive steps of:

mixing artificial graphite whose crystallites are flaky in shape, the artificial graphite having an average particle diameter from 10 to 100 μm, with natural graphite whose crystallites are squamous or scaly in shape, the natural graphite having an average particle diameter from 20 to 200 μm, wherein at least 20 to 80% by weight of the artificial graphite is mixed;

press-molding the mixed graphite; and sintering the press-molded graphite so as to form the carbon brush.

4. An electric motor comprising the carbon brush according to claim 1.

5. The method according to claim 3, wherein approximately 50% by weight of the artificial graphite is mixed.

6. An electric motor, comprising:

a rotor;

a coil that is wound around the rotor; and a carbon brush that supplies power to the coil, wherein the brush is formed by using a raw material in which artificial graphite whose crystallites are flaky in shape, the artificial graphite having an average particle diameter from 10 to 100 μm, is mixed with natural graphite whose crystallites are squamous or scaly in shape, the natural graphite having an average particle diameter from 20 to 200 μm, wherein at least 20 to 80% by weight of the artificial graphite is mixed.

7. The electric motor according to claim 6, wherein approximately 50% by weight of the artificial graphite is mixed.

* * * * *